United States Patent
Yamano et al.

(10) Patent No.: US 6,904,133 B2
(45) Date of Patent: *Jun. 7, 2005

(54) METHOD AND APPARATUS FOR COUPLING A VOICEBAND MODEM CIRCUIT TO A COMMON PHONELINE CONNECTOR

(75) Inventors: Larry C. Yamano, Sunnyvale, CA (US); Dane R. Snow, Santa Clara, CA (US); Jason Alexander Trachewsky, Menlo Park, CA (US); Ali Hariri, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/602,800

(22) Filed: Jun. 24, 2003

(65) Prior Publication Data

US 2004/0052344 A1 Mar. 18, 2004

Related U.S. Application Data

(63) Continuation of application No. 09/881,631, filed on Jun. 14, 2001, now Pat. No. 6,597,768.
(60) Provisional application No. 60/212,388, filed on Jun. 19, 2000.

(51) Int. Cl.[7] .............................................. H04M 11/00
(52) U.S. Cl. ............................ 379/93.05; 379/399.01; 379/90.01
(58) Field of Search ................ 379/90.01, 93.05–93.09, 379/93.33, 399.01, 399.02, 413.02–413.04, 398; 370/350; 333/17.1, 32

(56) References Cited

U.S. PATENT DOCUMENTS

| 6,069,899 A | 5/2000 | Foley |
| 6,144,734 A | 11/2000 | Beeman |
| 6,144,735 A | 11/2000 | Bella |
| 6,597,768 B2 * | 7/2003 | Yamano et al. .......... 379/93.05 |

* cited by examiner

Primary Examiner—Wing Fu Chan
(74) Attorney, Agent, or Firm—Christie, Parker & Hale, LLP (57) ABSTRACT

A method and apparatus for coupling a voiceband modem circuit to a common phoneline connector, the common phoneline connection having a ring line connection and a tip line connection which couples a ring/tip line pair to a subscriber loop circuit, the voiceband modem circuit operating in a voiceband modem operating frequency band and having a voiceband modem interface ring line and a voiceband modem interface tip line. The voiceband modem interface ring line is coupled to the ring line and the voiceband modem interface tip line is coupled to the tip line connection by inserting, between the ring line connection and the voiceband modem interface ring line and between the tip line connection and the voiceband modem interface tip line, a series pair of inductors. A first inductor of the series pair has a low inductance and a high self-resonant frequency and a second inductor of the series pair has a high inductance and low self-resonant frequency. The low inductance, the high self-resonant frequency, the high inductance and the low self-resonant frequency are each determined to locate a filtering cutoff point between the voiceband modem operating frequency band and a digital subscriber line operating frequency band.

12 Claims, 14 Drawing Sheets

METHOD AND APPARATUS FOR COUPLING A VOICEBAND MODEM CIRCUIT TO A COMMON PHONELINE CONNECTOR

CROSS-REFERENCE TO RELATED APPLICATIONS

This patent application is a continuation of U.S. patent application Ser. No. 09/881,631 filed on Jun. 14, 2001 now U.S. Pat. No. 6,597,768 which claims the benefit of the filing date of U.S. Provisional Patent Application No. 60/212,388 filed Jun. 19, 2000, the entire contents of which is hereby expressly incorporated by reference.

BACKGROUND OF THE INVENTION

The present invention relates to the field of voice and data communications, and in particular, a method and apparatus for coupling a voiceband modem circuit to a common phoneline connector for use in a home network communications system.

Referring to FIGS. 1a–1e, an evolution of home based communications systems is depicted.

Figure 1A:
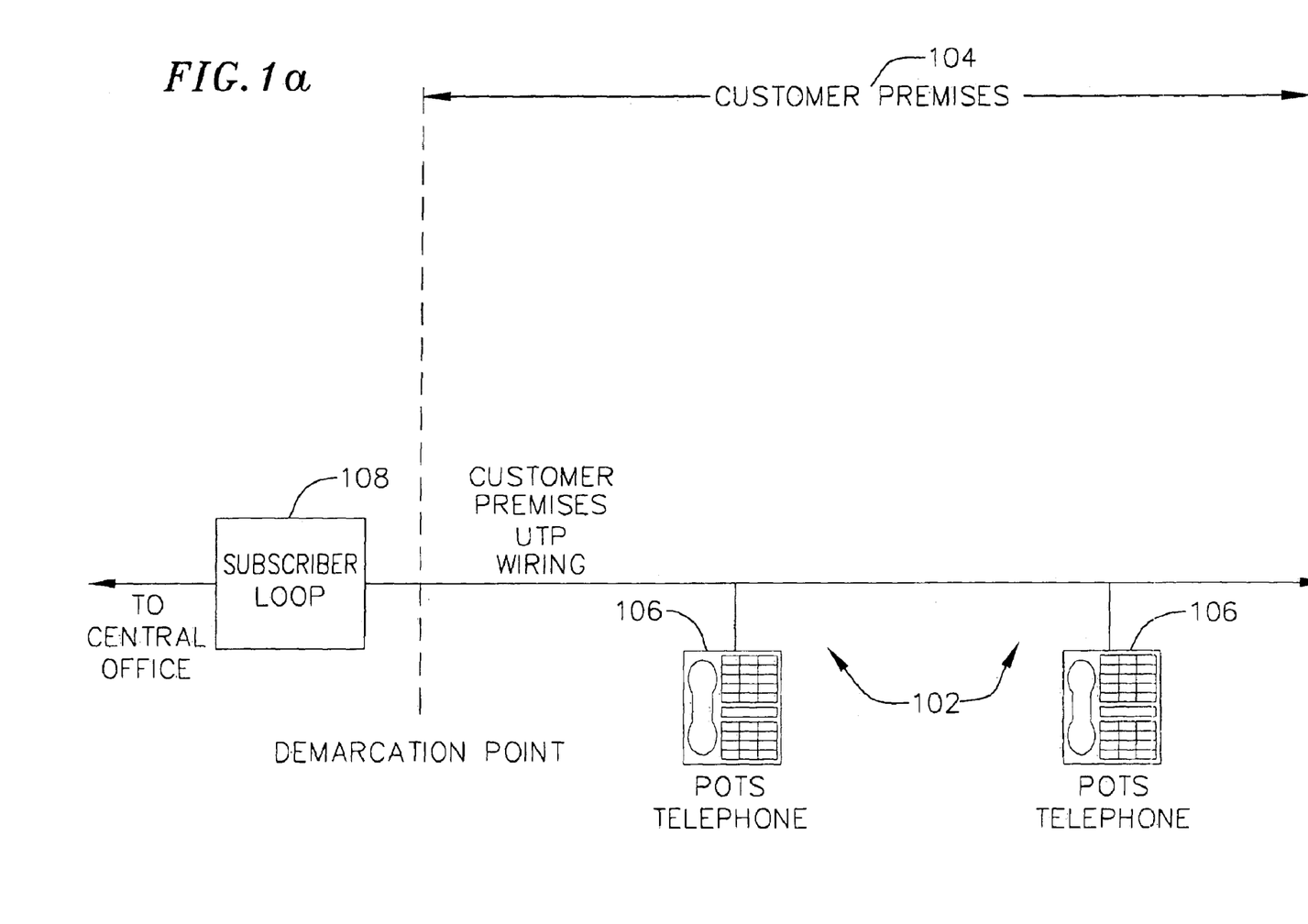
FIGS. 1a–1e show in block diagram form home networking environments within which the present invention can be implemented.

In FIG. 1a, plain old telephone service (POTS) wiring 102, generally unshielded twisted pair (UTP) wiring, at customer premises 104 couples POTS telephones 106 through subscriber loop 108 to a telephone company central office, which, in turn, is connected to the public switched telephone network (PSTN). Customer premises 104 is a telephone subscriber site that has arranged (generally for a monthly telephone service fee or for a per call minute fee) with a local provider (such as a local telephone company) for a connection to the central office. The central telephone office (also called a local exchange) provides local switching and non-local switching via the PSTN.

Figure 1B:
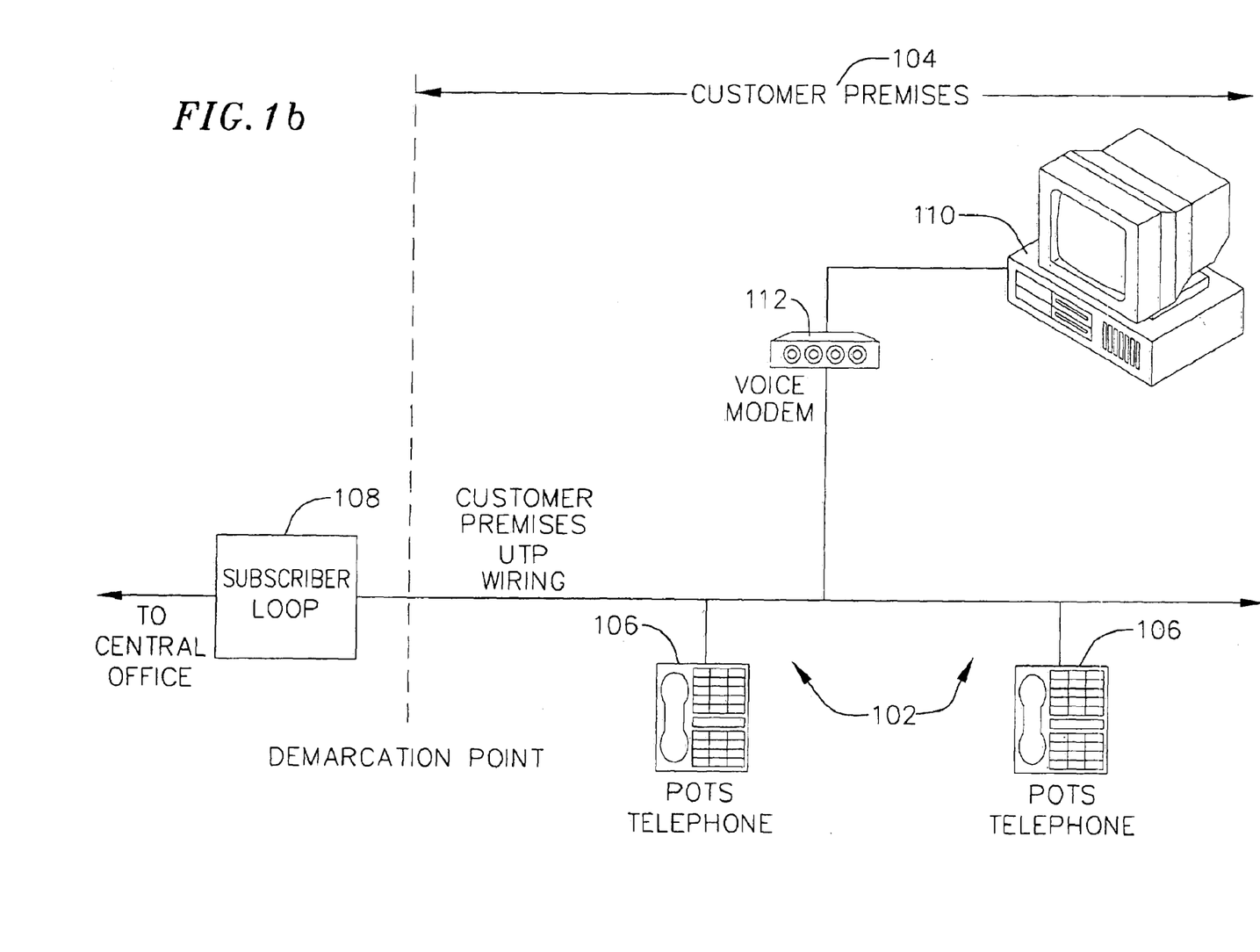

In FIG. 1b, computer 110 through conventional voice modem 112 can also be coupled to POTS wiring 102 to allow the transmission of signals from computer 110 to be transmitted onto the telephone network. Voice modem 112 will be described in more detail below.

Figure 1C:
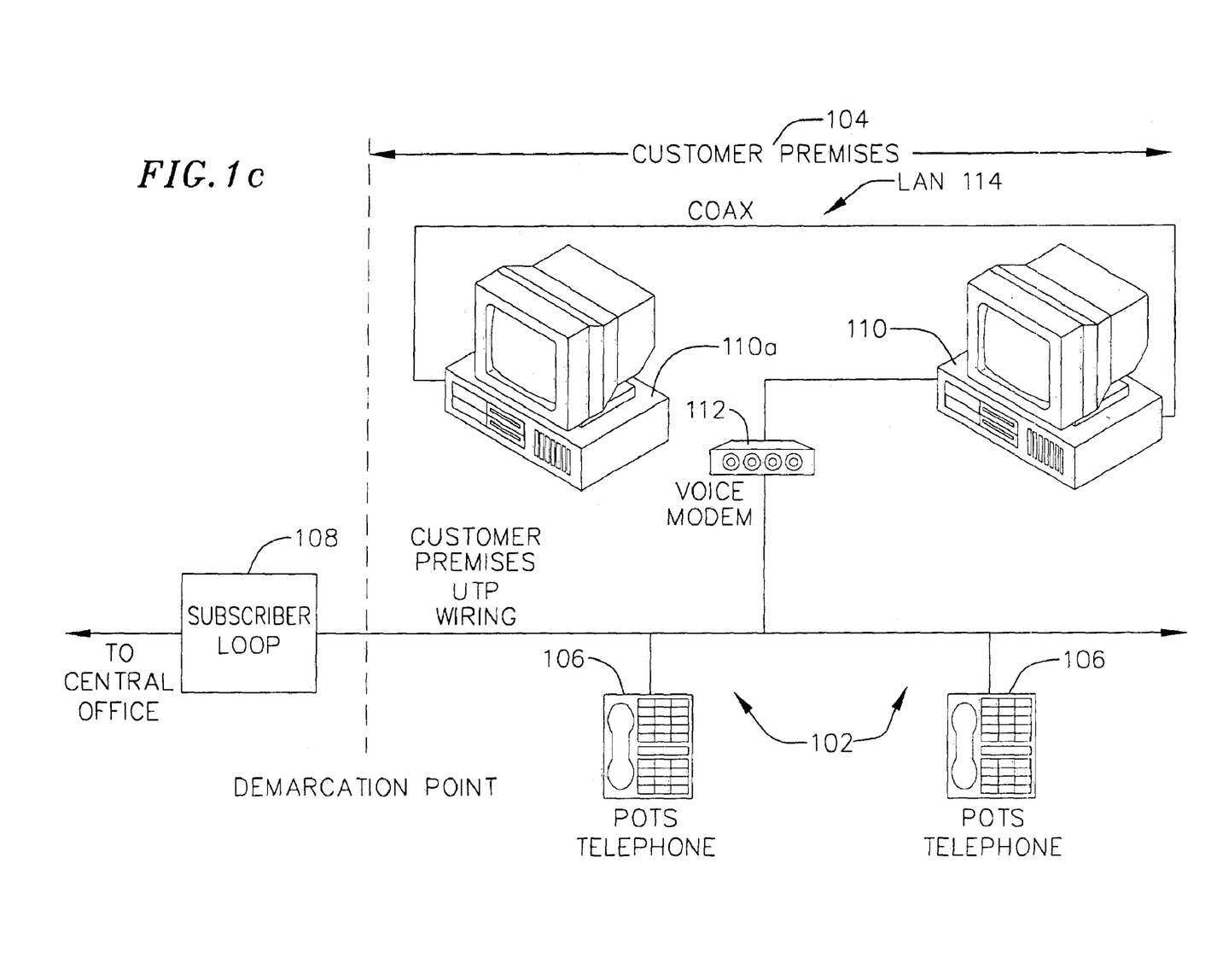

In FIG. 1c, there is depicted a conventional local area network (LAN) 114 (such as an ethernet network using coaxial cable) installed at customer premises 104 in addition to any POTS wiring 102 that may be in place to connect, for example, computer 110 with computer 110a.

Figure 1D:
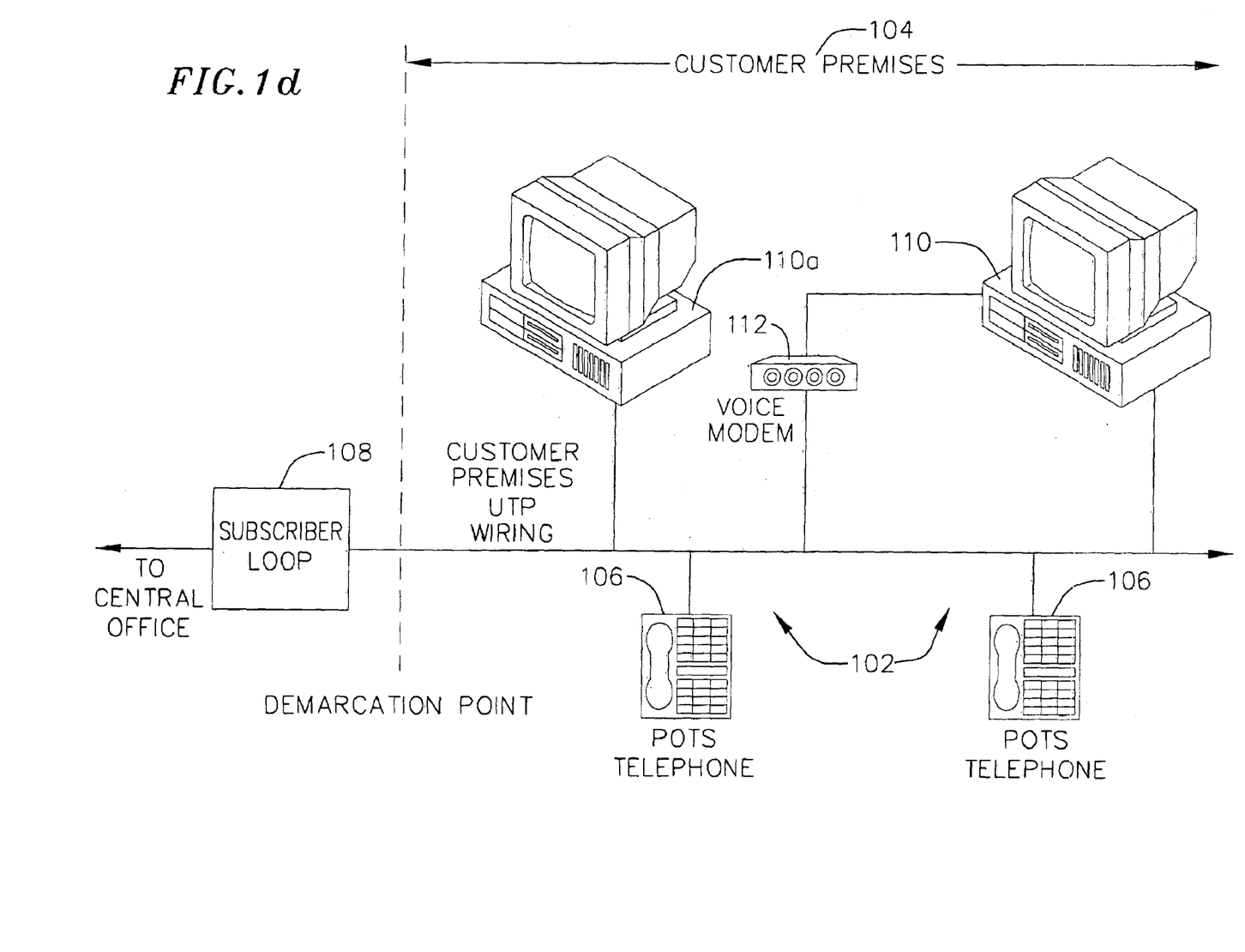

In FIG. 1d, computers 110 and 110a, rather than being connected via LAN 114 as seen in FIG. 1c, connects and utilizes POTS wiring 102 as a LAN transmission medium in accordance with the Home Phoneline Network Alliance (HPNA) specifications for the LAN computer interconnection over existing telephone lines within the local environment.

Figure 1E:
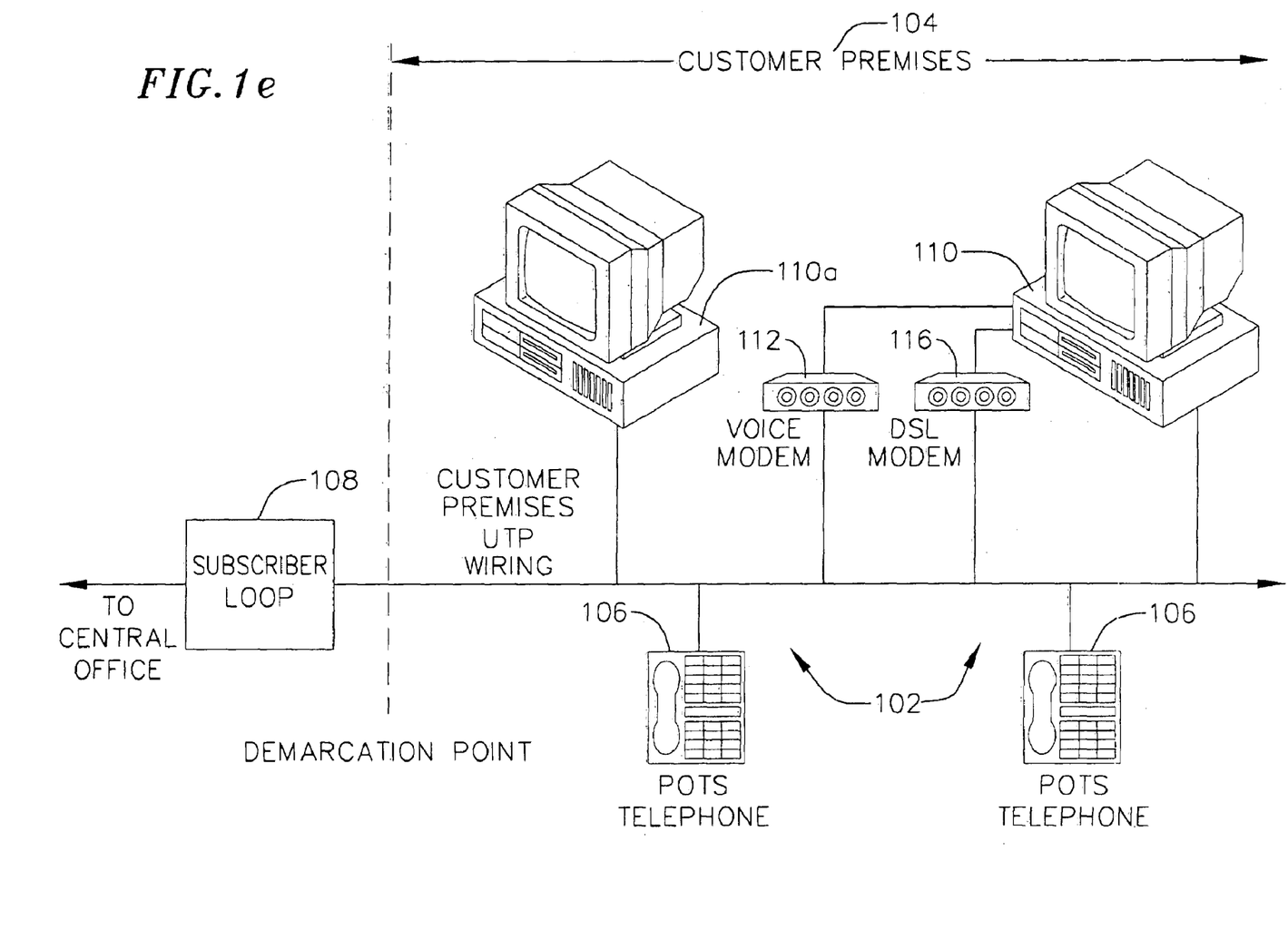

In FIG. 1e, computer 110, while implementing an HPNA LAN via POTS wiring 102, can also implement broadband digital data services through digital subscriber line (xDSL) modem 116, including one which supports asymmetrical digital subscriber line (ADSL) protocol, coupled to POTS wiring 102.

While broadband data services using DSL, or similarly cable modem or fixed wireless transceivers, are now being regularly deployed in home environments, there is still a need for basic connectivity using legacy voiceband data modems. Moreover, in the case of DSL and particularly ADSL, the broadband service may use the same physical metallic pair over which the voiceband modem signals travel to the PSTN central office, though at higher frequencies. In many cases, there may be no splitter (low-pass filter) between the in-premise wiring and the local loop.

Therefore, a need exists for a method and apparatus for attenuating high-frequency interfering signals, such as splitterless ADSL or phoneline network signals, at the front-end of a voiceband modem. The present invention provides a solution to this problem and will enable low-cost voiceband modems which use line-powered DAAs to be able to effectively connect to the PSTN.

SUMMARY OF THE INVENTION

In accordance with the present invention a method and apparatus for coupling a voiceband modem circuit to a common phoneline connector is provided, the common phoneline connection having a ring line connection and a tip line connection which couples a ring/tip line pair to a subscriber loop circuit, the voiceband modem circuit operating in a voiceband modem operating frequency band and having a voiceband modem interface ring line and a voiceband modem interface tip line.

In particular, in one embodiment of the present invention the voiceband modem interface ring line is coupled to the ring line and the voiceband modem interface tip line is coupled to the tip line connection by inserting, between the ring line connection and the voiceband modem interface ring line and between the tip line connection and the voiceband modem interface tip line, a series pair of inductors. A first inductor of the series pair has a low inductance and a high self-resonant frequency and a second inductor of the series pair has a high inductance and low self-resonant frequency. The low inductance, the high self-resonant frequency, the high inductance and the low self-resonant frequency are each determined to locate a filtering cutoff point between the voiceband modem operating frequency band and a digital subscriber line operating frequency band.

In another embodiment a method and apparatus for coupling a voiceband modem circuit and a digital subscriber line circuit to a common phoneline connector is provided, the common phoneline connection having a ring line connection and a tip line connection which couples a ring/tip line pair to a subscriber loop circuit, the voiceband modem circuit operating in a voiceband modem operating frequency band and having a voiceband modem interface ring line and a voiceband modem interface tip line, the digital subscriber line circuit operating in a digital subscriber line operating frequency band and having a digital subscriber line interface ring line and a digital subscriber line interface tip line. The voiceband modem interface ring line and the digital subscriber interface ring line are coupled in parallel to the ring line. The voiceband modem interface tip line and the digital subscriber interface tip line are coupled in parallel to the tip line connection. The coupling the voiceband modem interface, ring line and the coupling the voiceband modem interface tip line is by inserting, between the ring line connection and the voiceband modem interface ring line and between the tip line connection and the voiceband modem interface tip line, a series pair of inductors. A first inductor of the series pair has a low inductance and a high self-resonant frequency and a second inductor of the series pair has a high inductance and low self-resonant frequency. The low inductance, the high self-resonant frequency, the high inductance and the low self-resonant frequency are each determined to locate a filtering cutoff point between the voiceband modem operating frequency band and the digital subscriber line operating frequency band.

In still another embodiment a method and apparatus for coupling a voiceband modem circuit and a home phoneline circuit to a common phoneline connector is provided, the common phoneline connection having a ring line connection and a tip line connection which couples a ring/tip line pair to a subscriber loop circuit, the voiceband modem circuit operating in a voiceband modem operating frequency band and having a voiceband modem interface ring line and a voiceband modem interface tip line, the home phoneline circuit operating in a home phone line operating frequency band and having a home phoneline interface ring line and a home phoneline interface tip line. The voiceband modem interface ring line and the home phoneline interface ring line are coupled in parallel to the ring line. The voiceband modem interface tip line and the home phoneline interface tip line are coupled in parallel to the tip line connection. The coupling the voiceband modem interface ring line and the coupling the voiceband modem interface tip line is by inserting, between the ring line connection and the voiceband modem interface ring line and between the tip line connection and the voiceband modem interface tip line, a series pair of inductors. A first inductor of the series pair has a low inductance and a high self-resonant frequency and a second inductor of the series pair has a high inductance and low self-resonant frequency. The low inductance, the high self-resonant frequency, the high inductance and the low self-resonant frequency being each determined to locate a filtering cutoff point between the voiceband modem operating frequency band and the home phoneline operating frequency band.

In yet still another embodiment a method and apparatus for coupling a voiceband modem circuit, a digital subscriber line circuit and a home phoneline circuit to a common phoneline connector is provided, the common phoneline connection having a ring line connection and a tip line connection which couples a ring/tip line pair to a subscriber loop circuit, the voiceband modem circuit operating in a voiceband modem operating frequency band and having a voiceband modem interface ring line and a voiceband modem interface tip line, the digital subscriber line circuit operating in a digital subscriber line operating frequency band and having a digital subscriber line interface ring line and a digital subscriber line interface tip line, the home phoneline circuit operating in a home phoneline operating frequency band and having a home phoneline interface ring line and a home phoneline interface tip line. The voiceband modem interface ring line, the digital subscriber interface ring line and the home phoneline interface ring line are coupled in parallel to the ring line. The voiceband modem interface tip line, the digital subscriber interface tip line, and the home phoneline interface tip line being coupled in parallel to the tip line connection. The coupling the voiceband modem interface ring line, the digital subscriber interface ring line and the home phoneline interface ring line and the coupling the voiceband modem interface tip line, the digital subscriber interface tip line and the home phoneline interface tip line is by inserting, between the ring line connection and the voiceband modem interface ring line and between the tip line connection and the voiceband modem interface tip line, a series pair of inductors. A first inductor of the series pair has a low inductance and a high self-resonant frequency and a second inductor of the series pair has a high inductance and low self-resonant frequency. The low inductance, the high self-resonant frequency, the high inductance and the low self-resonant frequency are each determined to locate a filtering cutoff point between the voiceband modem operating frequency band and the digital subscriber line operating frequency band.

DETAILED DESCRIPTION OF THE INVENTION

Figure 2:
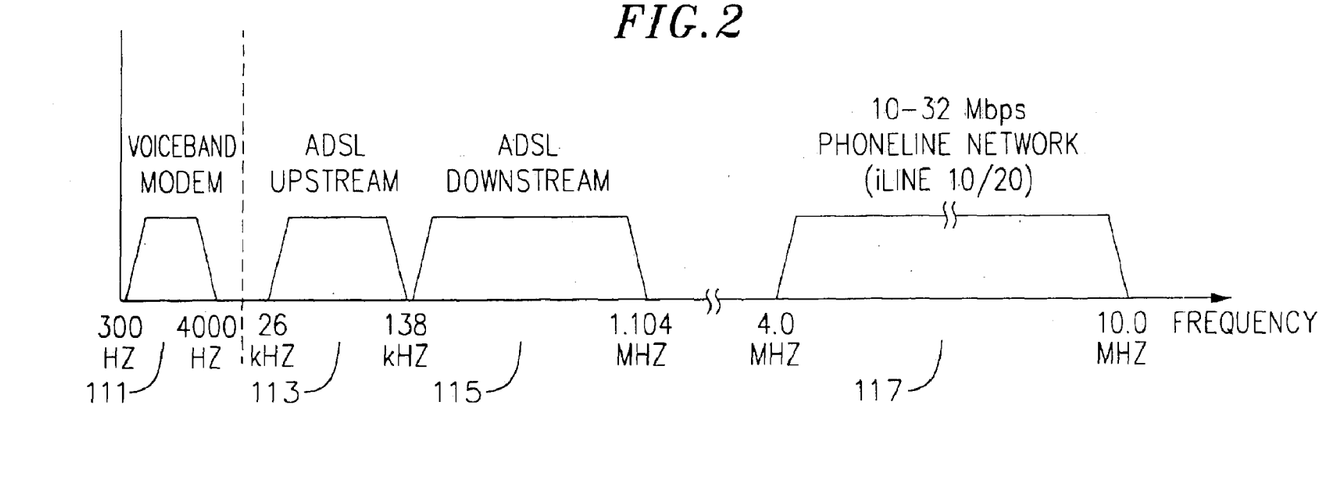
FIG. 2 shows a frequency diagram in accordance with an implementation of the present invention.

FIG. 2 depicts the typical frequency plans used by voiceband modems, HPNA, and one example of DSL (e.g., ADSL), over telephone wires, such as the system depicted in FIG. 1e. Voiceband modems would occupy frequency band 111 (300–4000 Hz). ADSL upstream would occupy frequency band 113 (26–138 kHz). ADSL downstream would occupy frequency band 115 (138 kHz–1.104 MHz). An HPNA implementation, such as the Broadcom Corporation family of iLine (tm)family of controllers, would occupy frequency band 117 (4–10 mHz).

Generally, the DSL service and the voiceband modem will not be used simultaneously. However, as voiceband modems are used in facsimile transmissions, a voiceband modem connection for fax transmission may occur while the DSL service is in use. Also, in some residential applications, the DSL service may be used to access the Internet in general (for personal use), but a voiceband modem (e.g. V.90) may be used to connect to one's place of work for security reasons. In some cases, the DSL service may be inaccessible due to routing problems at the local telephone service provider or internet service provider (ISP) but the DSL signal may still be present on the metallic pair (e.g., transmitting IDLE patterns). In these cases, it is desirable that the performance of the voiceband modem be not adversely impacted by the presence of the DSL signal. Adverse impact means reduction in connection probability or in maximum data throughput. Since the DSL signals use higher frequencies than voiceband modems, it may be possible to use a simple low-pass filter (LPF) to attenuate the interfering DSL signal before the voiceband modem signal is sampled and quantized (digitized) by an analog-to-digital converter (ADC) for further processing by the receiving voiceband modem. However, the filtering must be performed before the ADC to avoid aliasing of the high-frequency signal into the range of frequencies used by the voiceband modem.

Figure 3:
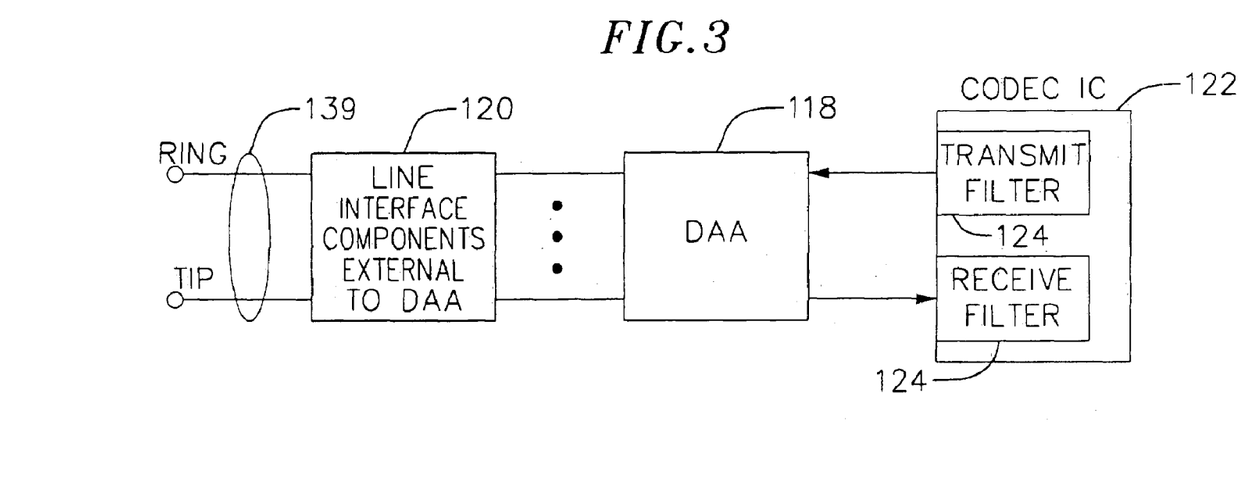
FIGS. 3–5 show in block diagram form overviews of representative voice band modems with which the present invention may be implemented.

Referring now to FIG. 3, in many voiceband modems, typical data access arrangement (DAA) integrated circuit (IC) 118 and interface components 120 coupled between codec IC 122 and telephone line ring/tip lines 139, provide a high-voltage telephone line interface and protect other circuits in the modem from the DC loop current, the ringing signal, and surges. Low-voltage codec integrated circuit 122 contains an analog-to-digital converter (ADC) for the receive path, a digital-to-analog converter (DAC) for the transmit path, and all of required low-pass filtering 124 to prevent aliasing and interference with higher frequencies. Since the filtering is implemented on an IC, it can be made at low cost.

Figure 4:
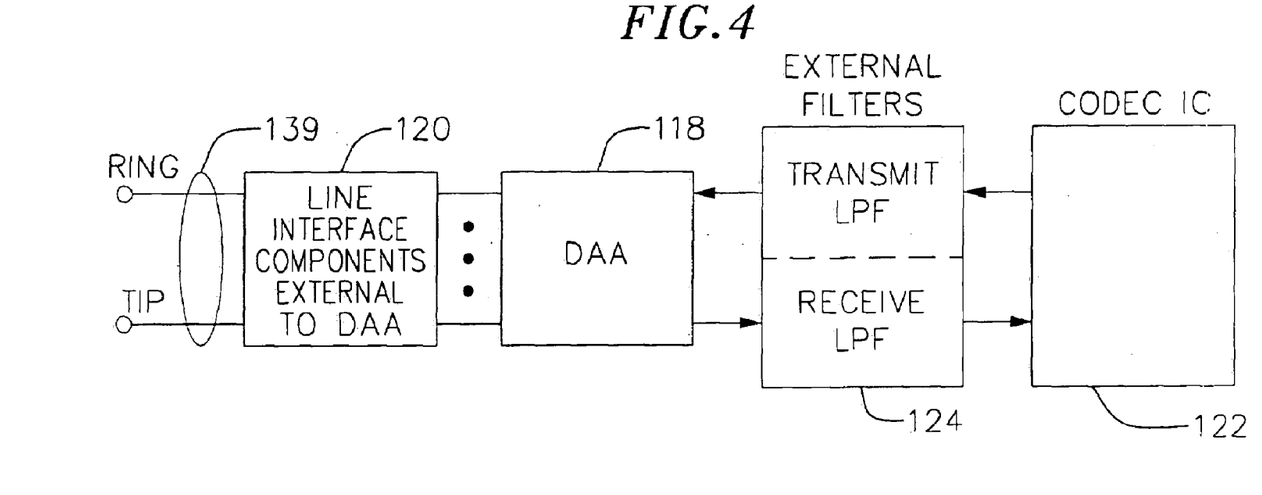
Figure 5:
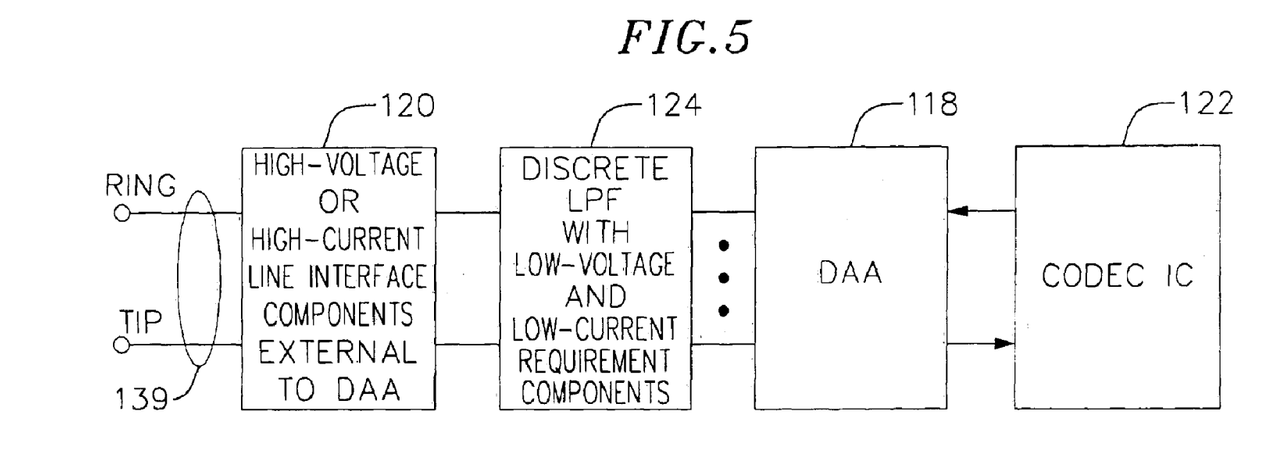

Alternatively, required low-pass filtering 124 may be performed with discrete components between the DAA and the codec as shown in FIG. 4, or directly before the DAA, as shown in FIG. 5. In all of these cases, the filters may be implemented with small components that do not need to withstand high voltages across them or have high currents carried through them.

However, in some voiceband modem products, such as the Broadcom Corporation Model BCM94211 Voiceband Modem and Phoneline Networking Transceiver, the DAA IC derives its power source for operation from the telephone line itself. Some DC loop current is drawn by the DAA from the central office battery, and, as tip and ring may be reversed, an external diode rectifier bridge is used to ensure the correct polarity of the inputs. Ordinarily, when the voiceband modem takes the telephone line off-hook (active), no less than 6 Volts DC is present across the device. The voiceband modem signal at tip and ring of the telephone line is roughly 2 Volts peak-to-peak when the modem is transmitting. This AC signal sums with the DC bias from the line, resulting in a time-varying voltage which drops as low as 4 Volts. The DAA's need to see a specified minimum voltage at its power supply input pin, the rectifier bridge's two diode drops, in addition to other losses before the DAA, do not leave much margin for correct circuit operation. If a DSL upstream signal is added across tip and ring and not attenuated prior to the rectifier bridge, it is likely that the DAA will not get a clean source of line power, and the voiceband modem will fail to connect or connect at a lower rate.

Figure 6:
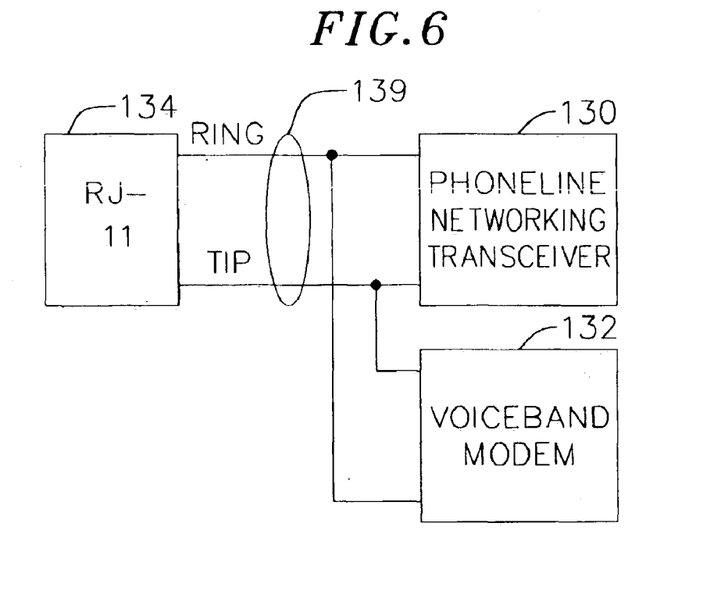
FIG. 6 shows in block diagram form a combination phone networking transceiver and voiceband modem with which the present invention may be implemented.
Figure 7:
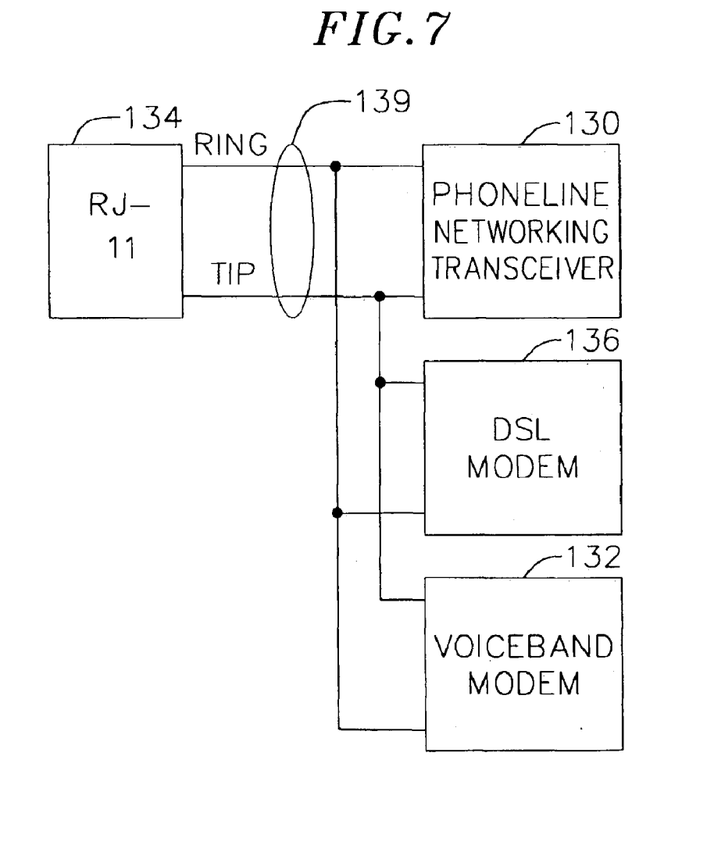
FIGS. 7–8 show in block diagram form a combination phone networking transceiver, DSL modem and voiceband modem with which the present invention may be implemented.

One straightforward solution to the problem would appear to involve installing a passive POTS microfilter at the input to the voiceband modem device. These microfilters are commonly installed by telephone companies providing splitterless DSL service, and they are attached either at the wall jack or the telephony device to protect the telephony device from high-frequency interference. This would appear to be a feasible, if expensive, solution provided that the voiceband modem is not a "combo" device, in which, for example, a voiceband modem and a phoneline networking transceiver are combined on one printed circuit board and connected to the phone line with a single connector. FIG. 6 shows an example of such a combo device, wherein phoneline networking transceiver 130 for an HPNA implementation and voiceband modem 132 are coupled in parallel to POTS phoneline RJ-11 connector 134 at ring/tip lines 139. Similarly, a combo device could also be expanded to include a voiceband modem, a DSL modem, and a phoneline networking transceiver on one printed circuit board. FIG. 7 shows an example of such an expanded combo device, wherein phoneline networking transceiver 130, voiceband modem 132 and DSL modem 136 are coupled in parallel to POTS phoneline RJ-11 connector 134 at ring/tip lines 139.

Figure 8:
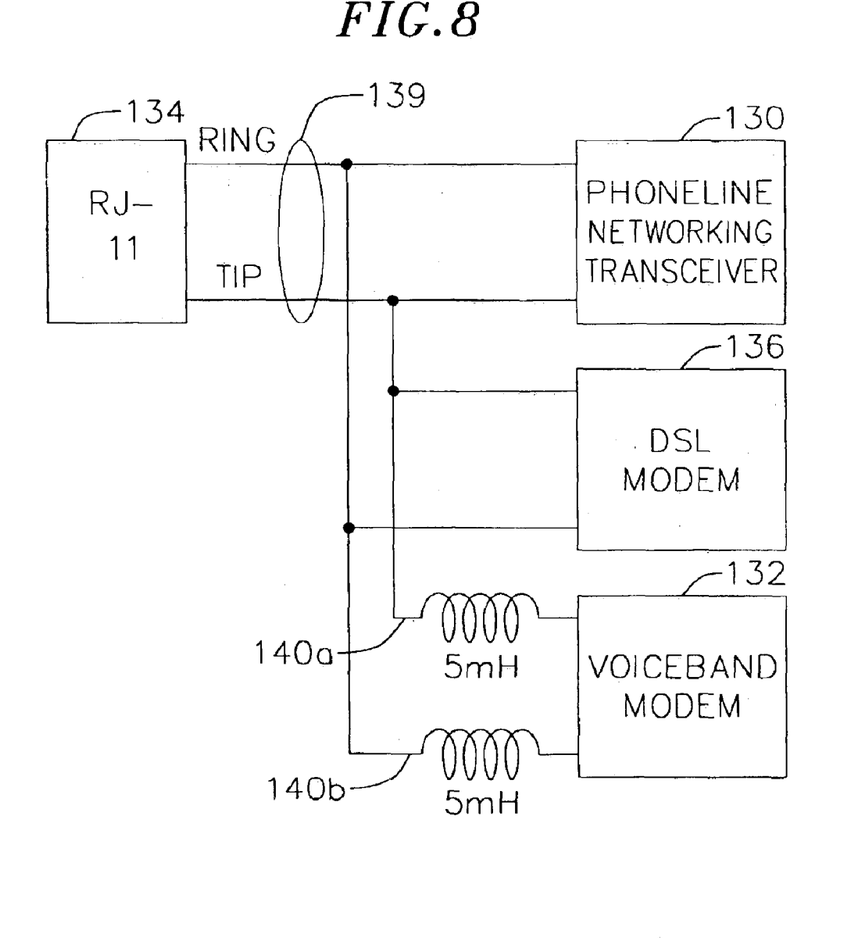
Figure 9:
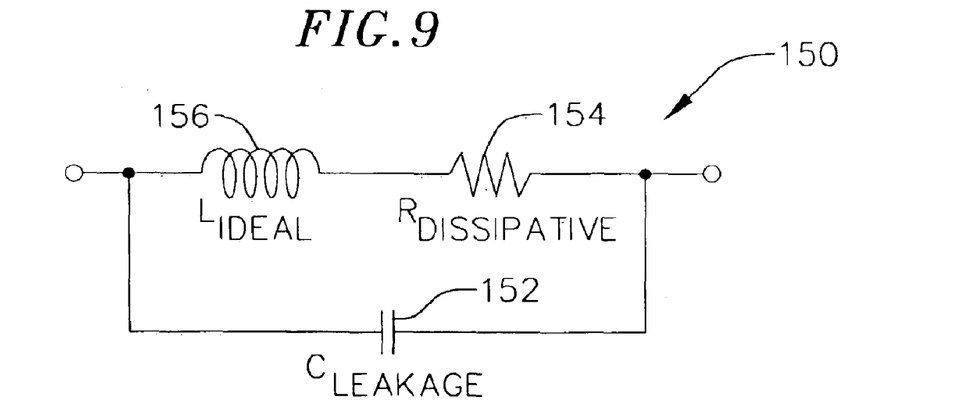
FIG. 9 shows in circuit diagram form a depiction of a realistic inductor.

Referring to FIG. 8, another straightforward solution would appear to involve merely adding two high-valued inductors (e.g. 5 mH) 140a, 140b in series with each of the ring/tip lines 139 connections of the implemention depicted in FIG. 7. If the value of these inductors is sufficiently-high, the high-frequency ADSL interfering signal will be sufficiently-attenuated before the rectifier bridge. However, the inductors must also not have a value high enough to significantly attenuate the voiceband modem signal, which occupies spectrum to 4000 Hz. The problem with this solution, referring to FIG. 9, is that a practical inductor 150 behaves more like ideal capacitor 152 in parallel with the series combination of resistor 154 and ideal inductor 156. Therefore, at higher frequencies, above the so-called "self-resonant frequency" $\omega r = 1/\sqrt{LC}$, the inductor's impedance actually drops with frequency, acting like a capacitor. The self-resonant frequency of the larger inductors tend to be low, in the hundreds of kHz. However, there is presently no commercially-available technique for building low-cost, high self-resonant frequency large inductors. Accordingly, the front-end of the voiceband modem with these large inductors would start to look like a short circuit at higher frequencies, affecting the performance of both the DSL downstream band and also the higher-frequency home phoneline network. Also, there arises a conflict between the need for a high inductance value, such as 5 mH, and the ability to handle a large DC current, such as 125 mA. (These inductors must be able to pass a DC subscriber loop current of up to 125 mA without saturating when the DAA goes off hook.) These conflicting requirements lead to bulky and expensive inductors and therefore it is important to minimize the filter complexity and the number of these inductors required.

Figure 10:
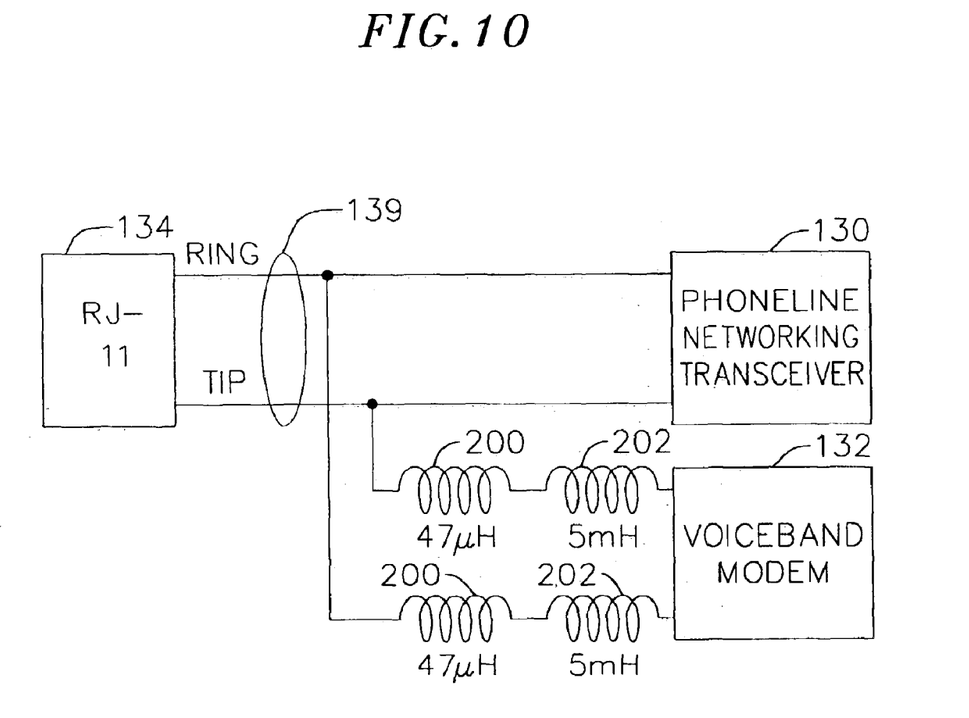
FIG. 10 shows in block diagram form an embodiment of the present invention.

Referring now to FIG. 10, phoneline networking transceiver 130 and voiceband modem 132 are coupled to RJ-11 connector 134 at ring/tip lines 139 (as in FIG. 6). However, between voiceband modem 132 and the ring/tip connections at ring/tip lines 139, low-valued inductor 200 (e.g. 47 $\mu$H) with high self-resonant frequency (tens of MHz) is placed in series high-valued inductor 202(e.g. 5 mH) with low self-resonant frequency (hundreds of kHz to a couple of MHz) at both tip and ring lines. Since the impedance of the ideal inductor is directly proportional to frequency, the use of the lower-valued, high-self-resonant-frequency inductor sufficiently protects the higher-frequency services from unwanted attenuation due to insertion of this device into the phone network. However, the high-valued, low-self-resonant-frequency inductor protects the voiceband modem receiver, and its line power source, from the ADSL upstream signal. Inductors 200, 202 are in essence valued to locate the filtering (cutoff) point between voiceband modem band 111 and ADSL upstream band 113 as shown in FIG. 2. At frequencies below the self-resonant frequency the inductors look like a true inductor, while at frequencies above the self-resonant frequency the inductors look like a capacitor. In the representative embodiment of series inductances as described above, the 5 mH inductor (a relatively high value inductance dictated by the filtering frequency desired) has a low-resonant frequency whose inductive properties for the voice modem cutoff frequency are extended out to a higher frequency than can be obtained by an individual 5 mH inductance. This inductive properties extension is achieved by providing the additional 47 $\mu$H inductor in series with the 5 mH inductor. In essence, the combination merely has a 5 mH inductance value because of the relatively small $\mu$H amount being added to a mH amount. Therefore, when the 5 mH inductor starts to operate like a capacitor, the 47 $\mu$H inductor will operate like an inductor and extend the inductive behavior out to a higher frequency. Therefore, the low-value inductor is low relative to the 5 mH (high value) inductor dictated by the filtering cutoff requirement, e.g., the values being of a two order of magnitude difference in values. The two orders of magnitude in inductor value will produce approximately two orders of magnitude difference in self-resonance frequency value.

Figure 11:
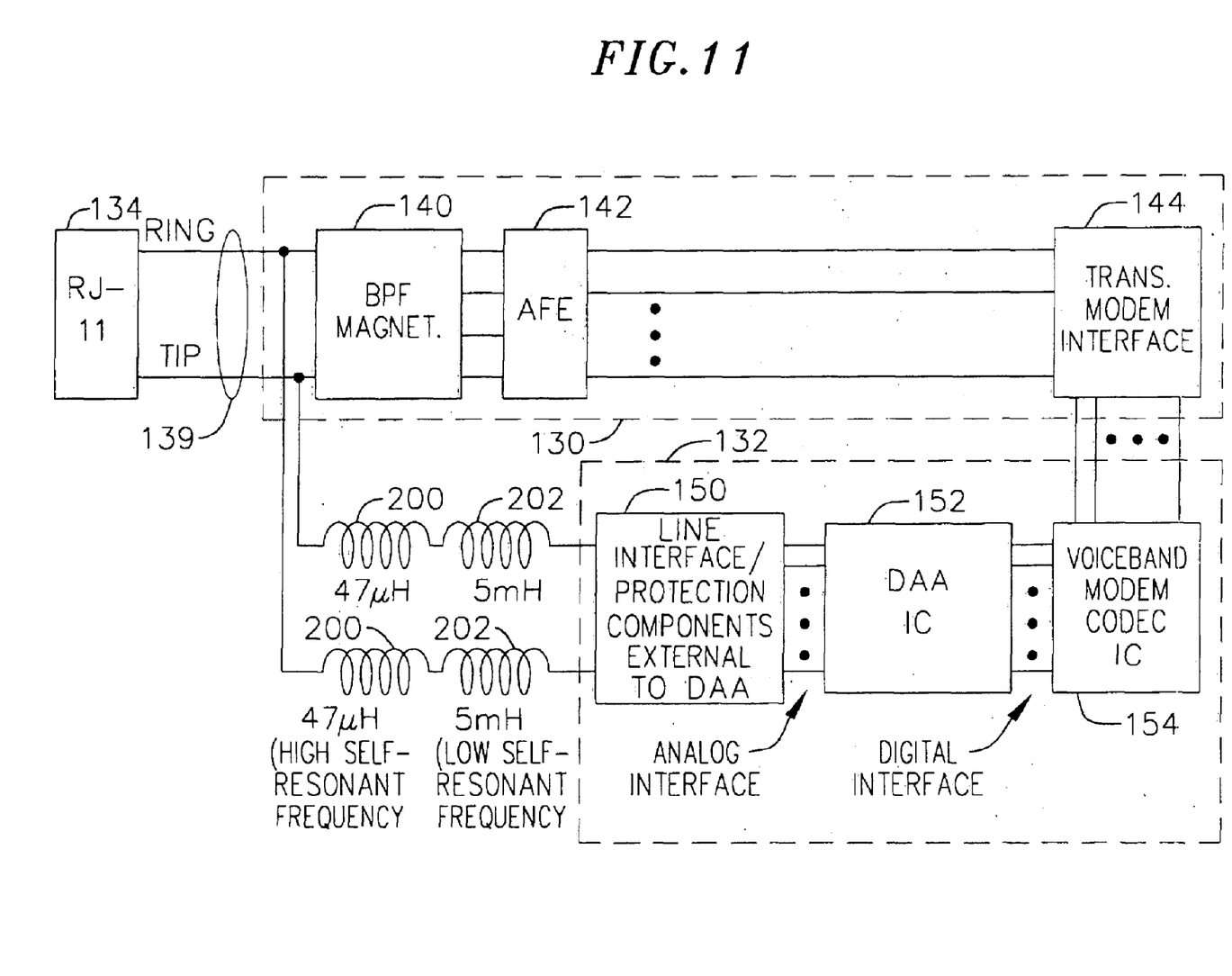
FIG. 11 shows in block diagram form a more detailed depiction of an embodiment of the present invention.

Referring to FIG. 11, the principal components of an embodiment of the combo device depicted in FIG. 10, for example, the Broadcom Corporation Model BCM94211, is shown implementing the present invention. Phoneline networking transceiver 130 includes bandpass filter/magnetics circuit 140 coupled between ring/tip lines 139 and analog front end 142. Transceiver and modem interface 144 is coupled to analog front end 142. Voiceband modem 132 includes line interface/protection circuit 150 coupled between high-valued inductor 202 and DAA IC 152. Voiceband modem 132 also includes codec 154 coupled between DAA IC 152 and transceiver and modem interface 144.

Figure 12A:
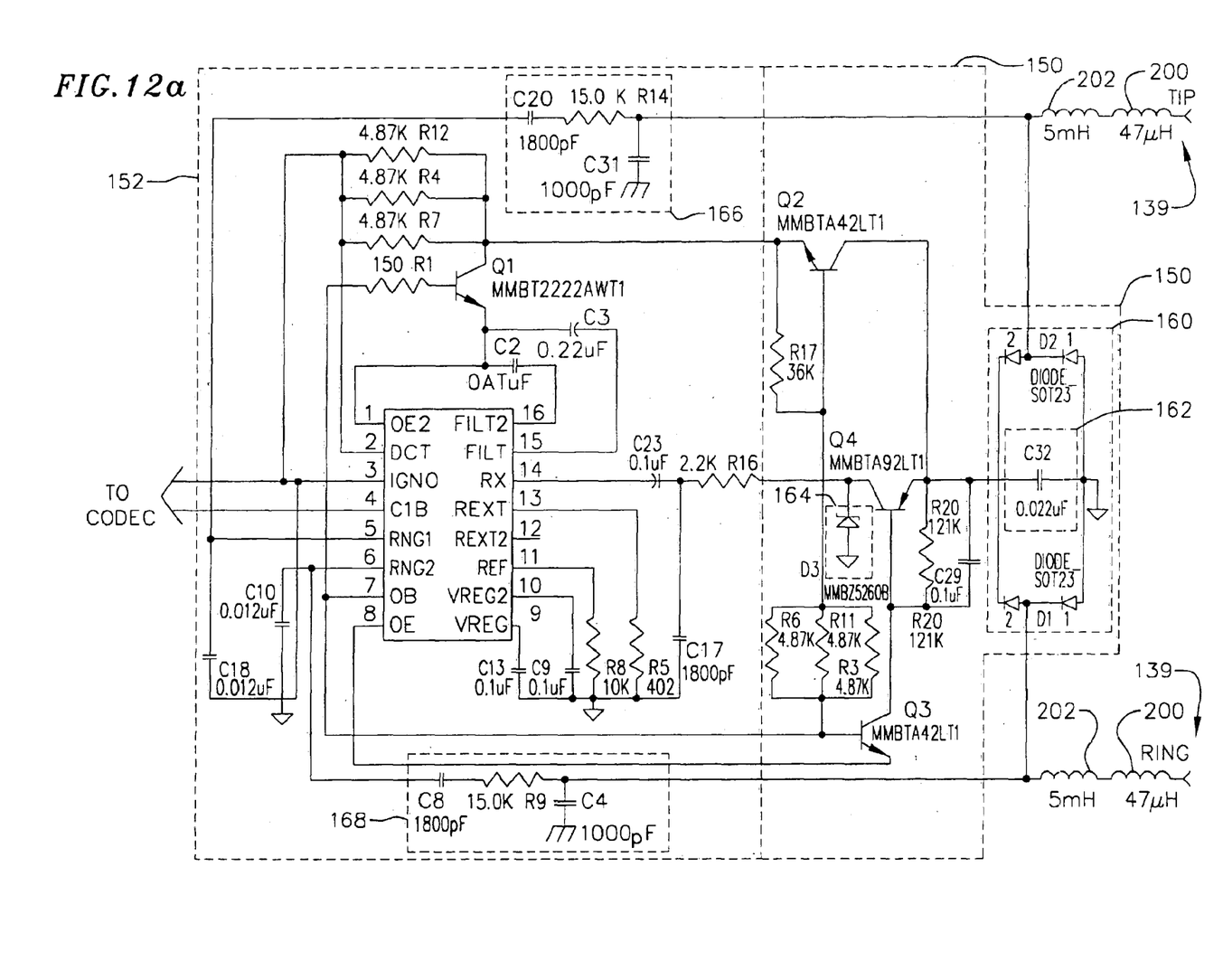
FIGS. 12a and 12b show in circuit diagram form a more detailed depiction of an embodiment of the present invention.
Figure 12B:
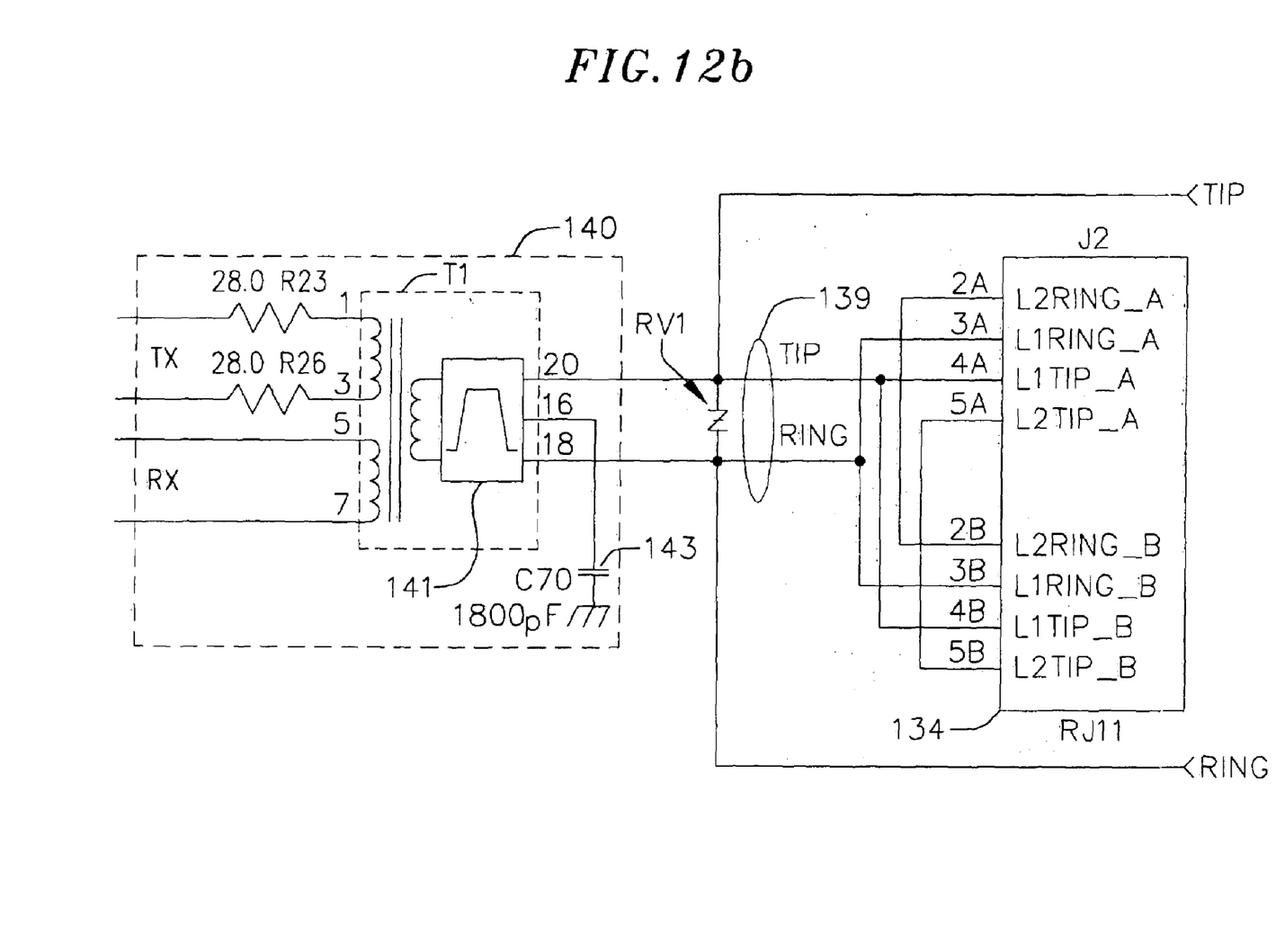

Referring now to FIGS. 12a and 12b, the interfaces between ring/tip lines 139, inductors 200, 202, interface/protection circuit 150 and bandpass filter/magnetics circuit 140 of FIG. 11 are shown in more detail. In FIG. 12a, the interface between ring/tip lines 139, and interface/protection circuit 150 is shown in more detail. Interface/protection circuit 150 is coupled to codec 154 (shown in FIG. 11) through standard DAA IC 152 and with ring/tip lines 139 through pairs of inductors 200, 202. Interface/protection circuit 150 includes diode protection bridge 160 for voltage polarity sensing. Diode protection bridge 160 includes filtering capacitor 162 and forms the low-pass filtering with the pairs of inductors 200, 202. Interface/protection circuit 150 also includes zener diode protection device 164. Interface/protection circuit 150 includes transistor switch sub-circuits Q2, Q3, Q4 with accompanying biasing resistors. DAA 152 includes by-pass capacitor sub-circuits 166, 168 which are in parallel with filtering capacitor 162. However, the capacitance values of by-pass capacitor sub-circuits 166, 168 being in the pf range add little to the capacitance provided by filtering capacitor 162 which is in the uf range. In FIG. 12b, bandpass filter/magnetics circuit 140 includes transformer T1 coupled to transmit TX and receive RX lines of analog front end 142. Bandpass filter/magnetics circuit 140 includes filter 141 and noise suppression capacitor 143 and is coupled to ring/tip lines 139. Ring/tip lines 139 connect to RJ-11 connector 134. Ring/tip lines 139 include therebetween over-voltage protection device RV1.

Figure 13:
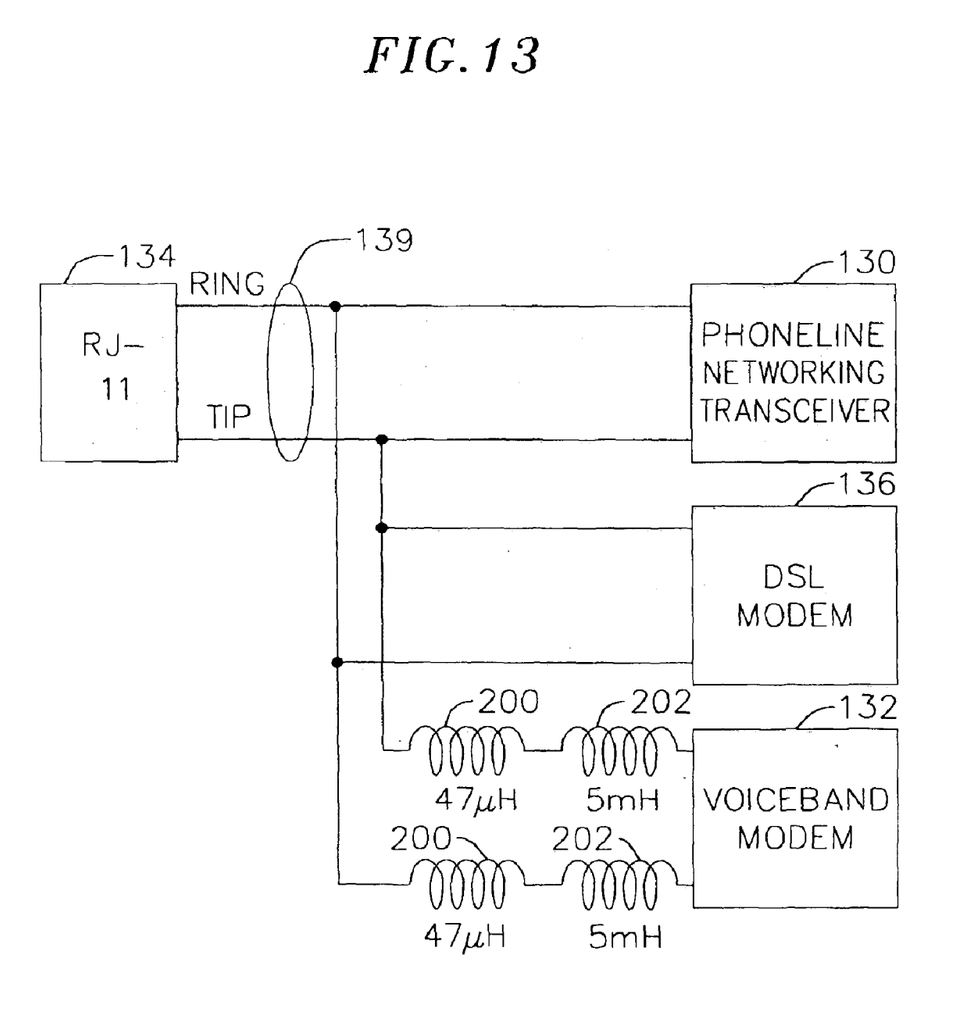
FIG. 13 shows in block diagram form a further implementation of an embodiment of the present invention.

Another possible embodiment of this invention is set forth in FIG. 13, wherein an expanded combo device of that shown in FIG. 7 is depicted. Phoneline networking transceiver 130, voiceband modem 132 and DSL modem 136 are coupled in parallel to POTS phoneline RJ-11 connector 134 at ring/tip line 139. In accordance with the present invention comparable inductors 200 and 202 can be interfaced with voiceband modem 132 and provide appropriate filtering such that interference signals from phoneline networking transceiver 130 and/or DSL modem 136 will not impact the operation of voiceband modem 132 in the same manner as described above for the combo device having merely the phoneline networking transceiver and the voiceband modem.

Therefore, in accordance with the present invention a circuit is provided for attenuating an interfering DSL signal within a voiceband modem while passing the voiceband modem signal to the remainder of the voiceband modem receiver path with negligible loss. The circuit is inserted at the line input to the modem, protecting line-powered DAAs from interference. It also does not affect the performance of the upstream or downstream DSL signals or the performance of home networks that share the same phone line, as it does not present a near short-circuit input impedance at higher frequencies. In addition, it enables devices to be implemented that combine voiceband modem, DSL, and/or home phoneline networking functionality.

What is claimed is:

1. A method of coupling a device operating at voiceband frequencies in parallel with a device operating at frequencies above voiceband comprising:

inserting at an input interface between the device operating at voiceband frequencies and the device operating at frequencies above voiceband a series pair of inductors, a first inductor of the series pair having a low inductance and a high self-resonant frequency and a second inductor of the series pair having a high inductance and low self-resonant frequency, the low inductance, the high self-resonant frequency, the high inductance and the low self-resonant frequency being each determined to locate a filtering cutoff point between the voiceband frequencies and the frequencies above voiceband.

2. The method of claim 1, wherein the frequencies above voiceband are digital subscriber line frequencies from a 26 kHz to 1.104 MHz frequency range.

3. The method of claim 1, wherein the frequencies above voiceband are home phoneline frequencies from a 4 Mhz to 10 Mhz frequency range.

4. The method of claim 1, wherein the device operating at voiceband frequencies is a facsimile device.

5. The method of claim 1, wherein the input interface is a common RJ-11 phoneline connection.

6. The method of claim 1, wherein the low inductance is 47 $\mu$H and the high inductance is 5 mH.

7. An interface circuit between a device operating at voiceband frequencies in parallel with a device operating at frequencies above voiceband comprising:

a series pair of inductors coupled between an input of the device operating at voiceband frequencies and an input of the device operating at frequencies above voiceband, a first inductor of the series pair having a low inductance and a high self-resonant frequency, and a second inductor of the series pair having a high inductance and low self-resonant frequency, the low inductance, the high self-resonant frequency, the high inductance and the low self-resonant frequency, being each determined to locate a filtering cutoff point between the voiceband frequencies and the frequencies above voiceband.

8. The interface circuit of claim 7, wherein the frequencies above voiceband are digital subscriber line frequencies from a 26 kHz to 1.104 MHz frequency range.

9. The interface circuit of claim 7, wherein the frequencies above voiceband are home phoneline frequencies from a 4 Mhz to 10 Mhz frequency range.

10. The interface circuit of claim 7, wherein the device operating at voiceband frequencies is a facsimile device.

11. The interface circuit of claim 7, wherein the input of the device operating at voiceband frequencies and the input of the device operating at frequencies above voiceband is a common RJ-11 phoneline connection.

12. The interface circuit of claim 7, wherein the low inductance is 47 $\mu$H and the high inductance is 5 mH.

* * * * *